(12) United States Patent
Li et al.

(10) Patent No.: US 10,699,705 B2
(45) Date of Patent: Jun. 30, 2020

(54) USING MACHINE-LEARNING MODELS TO DETERMINE MOVEMENTS OF A MOUTH CORRESPONDING TO LIVE SPEECH

(71) Applicant: Adobe Inc., San Jose, CA (US)

(72) Inventors: Wilmot Li, Seattle, WA (US); Jovan Popovic, Seattle, WA (US); Deepali Aneja, Seattle, WA (US); David Simons, Seattle, WA (US)

(73) Assignee: Adobe Inc., San Jose, CA (US)

( * ) Notice: Subject to any disclaimer, the term of this patent is extended or adjusted under 35 U.S.C. 154(b) by 183 days.

(21) Appl. No.: 16/016,418

(22) Filed: Jun. 22, 2018

(65) Prior Publication Data
US 2019/0392823 A1    Dec. 26, 2019

(51) Int. Cl.
| | | |
|---|---|---|
| *G10L 15/197* | (2013.01) | |
| *G06N 3/04* | (2006.01) | |
| *G06N 3/08* | (2006.01) | |
| *G10L 15/02* | (2006.01) | |
| *G10L 15/06* | (2013.01) | |
| *G10L 21/0316* | (2013.01) | |

(Continued)

(52) U.S. Cl.
CPC .......... *G10L 15/197* (2013.01); *G06N 3/0445* (2013.01); *G06N 3/08* (2013.01); *G10L 15/02* (2013.01); *G10L 15/063* (2013.01); *G10L 21/0316* (2013.01); *G10L 25/21* (2013.01); *G10L 25/24* (2013.01); *G10L 2015/025* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,366,885 B1 * | 4/2002 | Basu | .................... | G11B 27/031 704/235 |
| 6,665,643 B1 * | 12/2003 | Lande | .................... | G06T 9/001 345/474 |

(Continued)

OTHER PUBLICATIONS

Anonymous, "Real-Time Lip Sync for Live 2D Animation", Jan. 2017, 9 pages.

(Continued)

*Primary Examiner* — Mohammad K Islam
(74) *Attorney, Agent, or Firm* — Kilpatrick Townsend & Stockton LLP

(57) ABSTRACT

Disclosed systems and methods predict visemes from an audio sequence. A viseme-generation application accesses a first set of training data that includes a first audio sequence representing a sentence spoken by a first speaker and a sequence of visemes. Each viseme is mapped to a respective audio sample of the first audio sequence. The viseme-generation application creates a second set of training data adjusting a second audio sequence spoken by a second speaker speaking the sentence such that the second and first sequences have the same length and at least one phoneme occurs at the same time stamp in the first sequence and in the second sequence. The viseme-generation application maps the sequence of visemes to the second audio sequence and trains a viseme prediction model to predict a sequence of visemes from an audio sequence.

20 Claims, 9 Drawing Sheets

(51) Int. Cl.
 *G10L 25/21* (2013.01)
 *G10L 25/24* (2013.01)

(56) References Cited

U.S. PATENT DOCUMENTS

| | | | |
|---|---|---|---|
| 6,813,607 B1* | 11/2004 | Faruquie | G10L 21/06 704/258 |
| 7,015,947 B1* | 3/2006 | Hollier | H04N 17/00 348/180 |
| 8,775,167 B2 | 7/2014 | Mysore et al. | |
| 9,355,649 B2 | 5/2016 | King et al. | |
| 9,451,304 B2 | 9/2016 | King et al. | |
| 9,613,450 B2* | 4/2017 | Wang | G06T 13/40 |
| 9,922,665 B2* | 3/2018 | Matthews | G10L 21/10 |
| 2002/0097380 A1* | 7/2002 | Moulton | G03B 31/00 352/5 |
| 2003/0137515 A1* | 7/2003 | Cederwall | G06T 13/40 345/473 |
| 2005/0162432 A1* | 7/2005 | Ballin | G06T 13/20 345/473 |
| 2008/0259085 A1* | 10/2008 | Chen | G06T 13/205 345/473 |
| 2013/0195428 A1* | 8/2013 | Marks | H04N 5/93 386/278 |
| 2013/0304587 A1* | 11/2013 | Ralston | G06Q 30/0271 705/14.67 |
| 2016/0203827 A1* | 7/2016 | Leff | G10L 25/24 704/207 |
| 2017/0053665 A1* | 2/2017 | Quatieri, Jr. | G10L 25/27 |
| 2017/0154457 A1* | 6/2017 | Theobald | G06T 13/205 |
| 2018/0096677 A1* | 4/2018 | Pollet | G10L 13/04 |
| 2018/0253881 A1* | 9/2018 | Edwards | G10L 21/10 |
| 2019/0057714 A1* | 2/2019 | Scholar | G10L 15/187 |
| 2019/0122092 A1* | 4/2019 | Haines | G06F 11/3409 |
| 2019/0147838 A1* | 5/2019 | Serletic, II | G10H 1/368 704/260 |

OTHER PUBLICATIONS

Berndt, Donald J., et al., "Using dynamic time warping to find patterns in time series", KDD workshop, vol. 10, 1994, Seattle, WA, pp. 359-370.
Brand, Matthew, et al., "Voice puppetry", proceedings of the 26th annual conference on Computer graphics and interactive techniques, ACMPress/Addison-Wesley Publishing Co., 1999, pp. 21-28.
Cao, Yong, et al., 2005. "Expressive speechdriven facial animation", ACM Transactions on Graphics (TOG), vol. 24, No. 4, 2005, pp. 1283-1302.
Cappelletta, Luca, et al., "Phoneme-to-viseme Mapping for Visual Speech Recognition", 2012, ICPRAM (2), pp. 322-329.
Cohen, Michael M., et al., "Modeling coarticulation in synthetic visual speech", Models and Techniques in Computer Animation, 1993, pp. 139-156.
Collobert, Ronan, et al., "Torch7: A matlab-like environment for machine learning", BigLearn, NIPS Workshop, 2011, 6 pages.
Edwards, Pif, et al., 2016. "JALI: an animatorcentric viseme model for expressive lip synchronization", ACM Transactions on Graphics (TOG), vol. 35, No. 4, Article 127, 2016, p. 127-137.
Eronen, Antti J., et al., "Audio-based context recognition", IEEE Transactions on Audio, Speech, and Language Processing, vol. 14, No. 1, Jan. 2006, pp. 321-329.
Ezzat Tony, et al., "Miketalk: A talking facial display based on morphing visemes", proceedings of Computer Animation '98, 1998, pp. 96-102.
Failes, Ian 2016. "How *The Simpsons* Used Adobe Character Animator to Create a Live Episode", May 18, 2016, retrieved from http://bit.ly/1swlyXb.
Fan, Bo, et al., "Photo-real talking head with deep bidirectional LSTM", IEEE International Conference on Acoustics, Speech and Signal Processing (ICASSP), 2015, pp. 4884-4888.

Fox, "The Simpsons", 2016, retrieved from https://www.fox.com/the-simpsons/.
Furukawa, Shoichi, et al., "Voice Animator: Automatic Lip-Synching in Limited Animation by Audio", Advances in Computer Entertainment Technology, ACE 2017, Lecture Notes in Computer Science, vol. 10714, 2018, pp. 153-171.
Garofolo, John S., et al., "TIMIT Acoustic-Phonetic Continuous Speech Corpus" Linguistic Data Consortium, 1993.
Graves, Alex, et al., "Framewise Phoneme Classification With Bidirectional LSTM and Other Neural Network Architectures", Neural Networks, vol. 18, No. 5, 2005, pp. 602-610.
Graves, Alex, et al., "Hybrid Speech Recognition With Deep Bidirectional LSTM", IEEE Workshop on Automatic Speech Recognition and Understanding (ASRU), 2013, pp. 273-278.
Graves, Alex, et al., "Speech Recognition With Deep Recurrent Neural Networks", IEEE International Conference on Acoustics, Speech and Signal Processing (ICASSP), 2013, pp. 6645-6649.
Graves, Alex, et al., "Towards End-To-End Speech Recognition With Recurrent Neural Networks", proceedings of the 31st International Conference on Machine Learning (ICML-14, 2014, pp. 1764-1772.
Hochreiter, Sepp, et al., "Long Short-Term Memory", Neural Computation, vol. 9, No. 8, 1997, pp. 1735-1780.
Karras, Tero, et al., "Audiodriven Facial Animation by Joint End-To-End Learning of Pose and Emotion", ACM Transactions on Graphics (TOG), vol. 36, No. 4, Article 94, 2017, 12 pages.
Kim, Taehwan, et al., "A Decision Tree Framework for Spatiotemporal Sequence Prediction", proceedings of the 21st ACM SIGKDD International Conference on Knowledge Discovery and Data Mining, 2015, pp. 577-586.
Kingma, Diederik et al., "Adam: A Method for Stochastic Optimization", proceedings of 3rd International Conference for Learning Representations, San Diego, 2015, 15 pages.
Lee, Soonkyu, et al., "Audio-to-Visual Conversion Using Hidden Markov Models", proceedings of PRICAI: 7th Pacific Rim International Conference on Artificial Intelligence: Trends in Artificial Intelligence, 2002, pp. 9-20.
Lei, Xie, et al., "Context Dependent Viseme Models for Voice Driven Animation", proceedings of 4th EURASIP Conference focused on Video/Image Processing and Multimedia Communications, vol. 2, 2003, pp. 649-654.
Massaro, Dominic W., et al., "Picture My Voice: Audio to Visual Speech Synthesis using Artificial Neural Networks", proceedings of AVSP '99: International Conference on Auditory-Visual Speech Processing, Aug. 7-10, 1999, 6 pages.
Mattheyses, Wesley, et al., "Audiovisual Speech Synthesis: An Overview of the state-of-the-art", Speech Communication, vol. 66, Feb. 2015, pp. 182-217.
Suwajanakorn, Supasorn, et al., "Synthesizing Obama: Learning Lip Sync from Audio", ACM Transactions on Graphics (TOG), vol. 36, No. 4, Article 95, 2017, 13 pages.
Taylor, Sarah, et al., "A Deep Learning Approach for Generalized Speech Animation", ACM Transactions on Graphics (TOG), vol. 36, No., Article 93, 2017, 11 pages.
Taylor, Sarah L., et al., "Dynamic Units of Visual Speech", proceedings of the 11th ACM SIGGRAPH/Eurographics Symposium on Computer Animation, Eurographics Association, Jul. 29, 2012, pp. 275-284.
Vuylsteker, Bjorn, "Speech Recognition—A comparison of popular services in EN and NL", Feb. 12, 2017, 7 pages, retrieved from http://bit.ly/2BmZ3sn.
Walker, Willie, et al., "Sphinx-4: A Flexible Open Source Framework for Speech Recognition", Sun Microsystems, Dec. 2004, 18 pages.
Xu, Yuyu, et al., "A Practical and Configurable Lip Sync Method for Games", proceedings of Motion in Games, Nov. 7-9, 2013, Dublin, Ireland, pp. 131-140.
Yu, Dong, et al., "Automatic Speech Recognition: A Deep Learning Approach", 2014, Springer, 329 pages.

* cited by examiner

USING MACHINE-LEARNING MODELS TO DETERMINE MOVEMENTS OF A MOUTH CORRESPONDING TO LIVE SPEECH

TECHNICAL FIELD

This disclosure relates generally to animating virtual characters. More specifically, but not by way of limitation, this disclosure relates to using machine-learning models to determine an appearance of an animated mouth based on a sequence of speech samples.

BACKGROUND

Animation of virtual characters is a popular storytelling medium across many domains. But traditional workflows for doing so are labor intensive. For example, animators often draw every frame by hand, or manually specify how characters move when uttering a particular word. Animators specify how a character's lips move in accordance with the character's speech. For example, when a character utters the syllable "a," the character's mouth makes the same shape that a human's mouth would make when speaking the syllable.

Automated animation removes the burden of hand-animating every mouth movement. For example, in live or performance animation, a computing system controls cartoon characters in response to an animator's input or speech. But existing solutions either cannot operate in real time, i.e., perform live animation, or are not able to provide an animation that is realistic and accurate. For example, existing solutions can result in a character's mouth not moving at all or moving too much relative to an expected movement.

Additionally, solutions for live animation are often based on prediction models that predict animation sequences from speech. But such models require the use of training data, which is time-consuming to generate because audio sequences are hand-mapped to visemes. One minute of speech can take five to seven hours of work to hand-animate.

Accordingly, improved solutions are needed for live animation and generating training data for prediction models that are used for live animation.

SUMMARY

Systems and methods are disclosed herein for predicting visemes from an audio sequence. In an example, a viseme-generation application accesses a first set of training data. The first set of training data includes a first audio sequence representing a sentence spoken by a first speaker, having a first length, and representing a sequence of phonemes and a sequence of visemes. Each viseme is mapped to a respective audio sample of the first audio sequence. The viseme-generation application creates a second set of training data by accessing a second audio sequence representing the sentence spoken by a second speaker, having a second length, and including the sequence of phonemes. The viseme-generation application adjusts the second audio sequence such that the second sequence length is equal to the first length and at least one phoneme occurs at the same time stamp in the first sequence and in the second sequence. The viseme-generation application maps the sequence of visemes to the second audio sequence. The viseme-generation application trains a viseme prediction model to predict a sequence of visemes from an audio sequence.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings.

DETAILED DESCRIPTION

Figure 1:
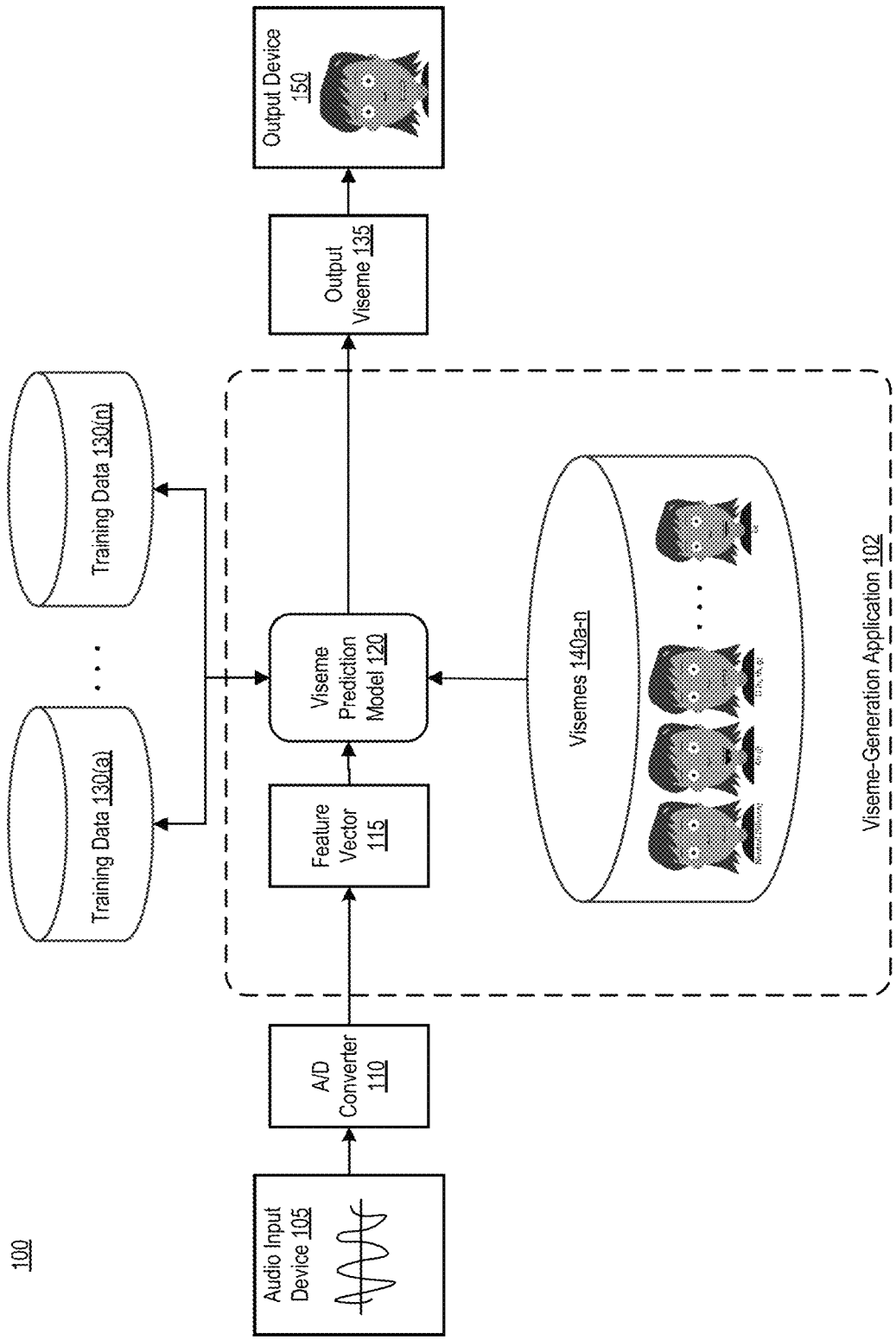
FIG. 1 is a diagram depicting a viseme-generation system, according to certain embodiments of the present disclosure.

Embodiments described herein use time-warping techniques to automate the generation of robust and diverse training data sets used to train predictive models used in live and performance animation systems, and in some cases, apply these models to automate animation based on an audio sequence. As discussed above, generating training data for predictive models used in animation systems is cumbersome and time consuming.

In an example, viseme-generation application accesses a first set of training data. The first set of training data includes a first audio sequence and a sequence of visemes that can be used to animate a character. The first audio sequence represents a sequence of phonemes, or sounds, from a sentence spoken by a first speaker. Each viseme in the sequence of visemes corresponds to a respective audio sample in the first audio sequence. For example, a viseme has a time stamp corresponding to a time at which the first speaker uttered a phoneme corresponding to the viseme.

The viseme-generation application uses time-warping techniques on the first set of training data to generate a second set of training data with audio from a second speaker, without the need to label the visemes by hand. Time warping adjusts for differences in speech of different individuals, such as intonation, emphasis, or speed, such that uttered phonemes in the second sequence occur at identical time stamps as the corresponding phonemes in the first audio sequence.

More specifically, the viseme-generation application accesses a second audio sequence that corresponds to the sequence of phonemes generated by a second speaker speaking the same words as the first speaker. The viseme-generation application adjusts the second audio sequence such that a length of the second audio sequence is equal to a length of the first audio sequence and such that the phonemes uttered by the second speaker occur at the same time stamps as the corresponding phonemes occur in the first sequence. The timing of the phonemes is thereby warped to fit the second audio sequence.

Subsequently, the viseme-generation application matches the sequence of visemes to the second audio sequence. Because the viseme-generation application has mapped the second audio sequence to the first audio sequence, the viseme sequence corresponds to the second audio sequence and can be reused. Hence, no hand-animation or hand-mapping of visemes is needed.

This process can continue for different speakers, and such training data can be provided to a predictive model, thereby increasing the robustness of the model. The viseme-generation application then trains a viseme prediction model to predict a sequence of visemes from the first training set and the second training set. Optionally, the viseme-generation application represents a sequence of audio as one or more feature vectors, provides the feature vectors to a predictive model trained with the training data, and obtains a prediction for a viseme corresponding to the audio sequence. Viseme-generation application can operate in real time, thereby facilitating improved live animation systems.

FIG. 1 is a diagram depicting a viseme-generation system, according to certain embodiments of the present disclosure. Viseme-generation system 100 includes one or more of viseme-generation application 102, audio input device 105, Analog-to-Digital (A/D) converter 110, training data 130a-n, output viseme 135, and output device 150. Viseme-generation application 102 includes feature vector 115, viseme prediction model 120, and visemes 140a-n.

In an example, viseme-generation application 102 receives an audio sequence from audio input device 105, generates feature vector 115, and uses viseme prediction model 120 to a select an output viseme 135. Output viseme 135 is selected from visemes 140a-n, each of which corresponds to a distinct mouth shape. Visemes are discussed further with respect to FIG. 2. Feature vector 115 can include various representation of the audio sequence [and] is discussed further with respect to FIG. 4.

Audio input device 105 can be a microphone or an analog signal that represents audio. A/D converter 110 converts analog audio into digital samples by sampling and then quantizing the analog signal. Audio input device 105 receives audio from an animator and passes the audio to A/D converter 110, which converts the audio into audio samples. Viseme-generation application 102 receives the audio samples from A/D converter 110. In an embodiment, digital audio samples are received from a network connection and passed directly into viseme-generation application 102. For example, the digital audio samples can be generated via a speech synthesis application that outputs samples representing a cartoon voice based on textual or other input.

In an embodiment, viseme-generation application 102 animates a character (e.g., a computer-generated puppet) based on the determined viseme and provides the animation to output device 150, such as a display. Alternatively, viseme-generation application 102 can provide the viseme directly to another application such as an animation application.

In a further example, viseme-generation application 102 generates training data 130a-n for training viseme prediction model 120. More specifically, viseme-generation application 102 uses techniques such as time-warping to generate additional sets of training data 130b-n from training data 130a. Training data 130a includes a first audio sequence and a corresponding viseme sequence. Viseme-generation application 102 trains viseme prediction model 120 with training data 130a-n. Viseme prediction model 120 can be a viseme prediction model, such as a recurrent neural network or a Long Short-Term Memory (LSTM) model.

Figure 2:
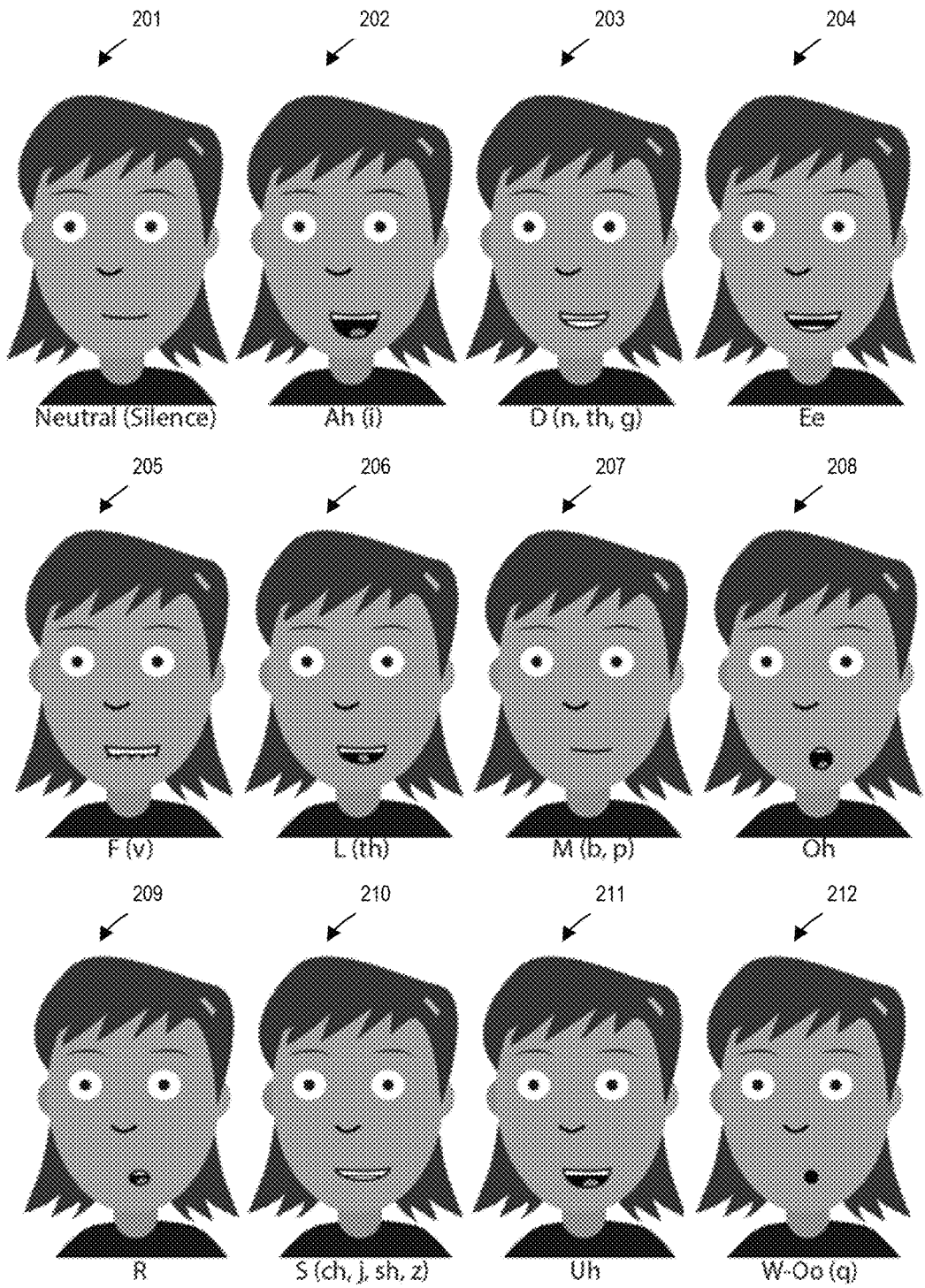
FIG. 2 depicts an example of a viseme set used by a viseme-generation system, according to certain embodiments of the present disclosure.

FIG. 2 depicts an example of a viseme set used by a viseme-generation system, according to certain embodiments of the present disclosure. FIG. 2 depicts viseme set 200, which includes visemes 201-212. Each of the visemes 201-201 corresponds to a unique mouth shape. Visemes 201-212 represent, respectively, silence, a mouth appearance for an "Ah" sound, a mouth appearance for a "D" sound, a mouth appearance for a "Ee" sound, a mouth appearance for a "F" sound, a mouth appearance for a "L" sound, a mouth appearance for a "M" sound, a mouth appearance for a "Oh", a mouth appearance for a "R" sound, a mouth appearance for a "S" sound, a mouth appearance for a "Uh" sound, and a mouth appearance for a "W-Oo" sound.

In some embodiments, the unique mouth shapes may not correspond accurately with mouth shapes used by humans when speaking. For instance, the viseme may vary slightly from expected human mouth shapes due to emphasis employed in the animation, which can vary by animation style.

Figure 3:
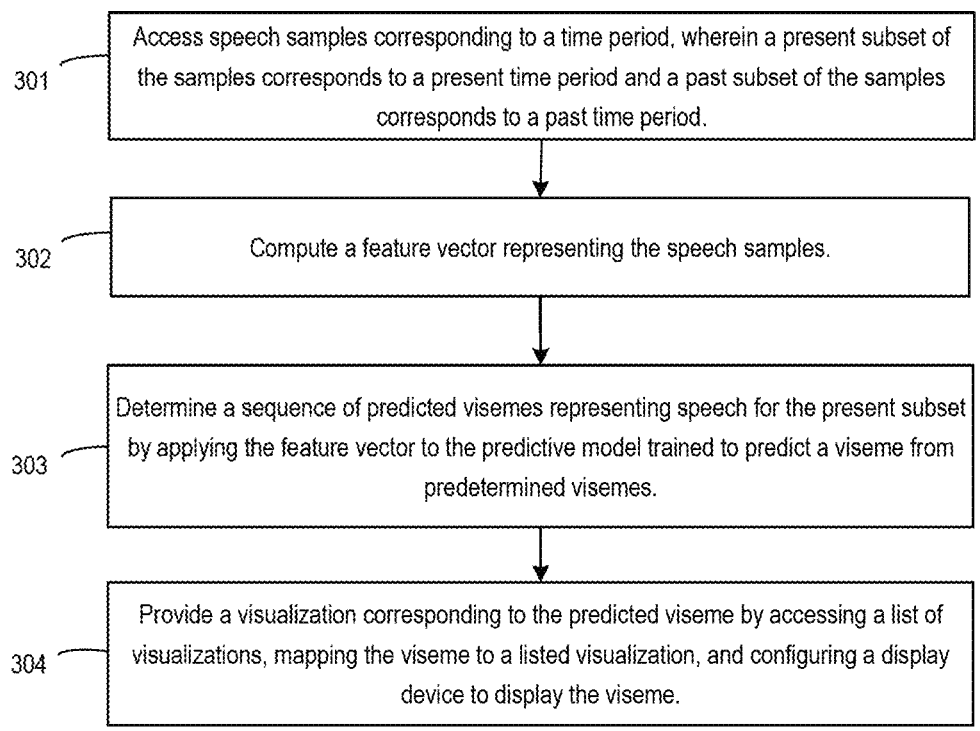
FIG. 3 is a flowchart that depicts an example of a process for generating a sequence of visemes from an audio sequence, according to certain embodiments of the present disclosure.

FIG. 3 is a flowchart that depicts an example of a process for generating a sequence of visemes from an audio sequence, according to certain embodiments of the present disclosure. Process 300 is described with respect to viseme-generation application 102 as depicted in FIG. 1, but can be implemented by other systems.

At block 301, process 300 involves accessing speech samples corresponding to a time period. Viseme-generation application 102 can receive audio sequence generated in real time by audio input device 105 via A/D converter 110. Viseme-generation application 102 analyzes speech samples in sequences, or windows of time.

For example, viseme-generation application 102 can use a sliding window (e.g., 25 milliseconds) of samples with a particular stride (e.g., 10 milliseconds). In this example, viseme-generation application 102 buffers incoming audio samples from 0 to 25 milliseconds, creates a first feature vector from the buffer of input samples, receives more audio samples and creates a second feature vector from audio samples from 10 milliseconds to 35 milliseconds, and so on. A given audio sequence can include audio samples from the present, a past time period, or a future time period relative to the output viseme.

At block 302, process 300 involves computing a feature vector representing the speech samples. Viseme-generation application 102 computes a feature vector 115 from the speech samples. Feature vector 115 represents the sequence, or window, of audio samples in a manner suitable for the viseme prediction model. Feature vector 115 can include different features, for example, the audio samples themselves, statistics derived from the audio samples, mel-frequency cepstrum coefficients (MFCCs) coefficients, time derivatives, energy calculations, etc. Viseme-generation application 102 can derive such features from audio samples using different methods.

Figure 4:
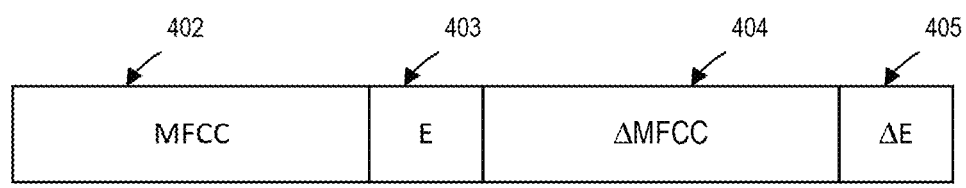
FIG. 4 depicts an example of feature vector used by a viseme-generation system, according to certain embodiments of the present disclosure.

FIG. 4 depicts an example of a feature vector 400 generated by viseme-generation application 102. Feature vector 400 includes MFCC component 402, energy component 403, MFCC derivatives 404, and energy level derivative 405. In an example, feature vector 115 is a 28-dimensional feature vector, but other size dimensions are possible. As depicted in FIG. 4, feature vector 400 includes MFCC component 402 of length thirteen, energy component 403 of length one, MFCC derivatives 404 of length thirteen, and energy value derivative 405 of length one.

MFCCs are a frequency-based representation with non-linearly spaced frequency bands that roughly match the response of the human auditory system. Feature vector 115 can include any number of MFCCs derived from the audio sequence.

In an embodiment, before computing MFCCs, viseme-generation application 102 can filter the input audio to boost signal quality. In an example, viseme-generation application 102 compresses and boosts the input audio levels by using a Hard Limiter filter. A Hard Limiter filter can attenuate audio that is greater in amplitude than a predefined threshold. The Hard Limiter filter is typically applied in conjunction with an input boost, which increases overall volume while avoiding distortion.

Feature vector 115 can include energy component 403. Energy component 403 represents the energy of the sequence of the audio samples in the window, for example, using a function such as the log mean energy of the samples.

Feature vector 115 can include MFCC derivatives 404 or energy level derivative 405. Including time derivatives in feature vector 115 benefits viseme prediction model 120 because derivatives can make changes in the audio more apparent to the predictive model. For example, changes in the audio can cause large changes in the MFCCs, that cause the derivatives to change, causing viseme prediction model 120 to recognize an upcoming transition between visemes in the output sequence.

Time derivatives can cause noise if computed at the same frequency as the MFCCs. As such, viseme-generation application 102 can average the time derivatives over a larger temporal region than the standard audio sequence window, thereby smoothing out large values.

But because such averaging of time, derivatives over multiple time windows can cause latency due to buffering. In an embodiment, viseme prediction model 120 calculates time derivatives using averaged finite differences between MFCCs computed two windows before and after the current MFCC window.

Returning to FIG. 3, at block 303, process 300 involves determining a sequence of predicted visemes representing speech for the present subset by applying the feature vector to the viseme prediction model. Viseme prediction model 120 is trained to predict a viseme from predetermined visemes. More specifically, viseme-generation application 102 provides feature vector 115 to viseme prediction model 120. Viseme prediction model 120 receives a predicted output viseme 135.

Viseme prediction model 120 can be implemented with different types of predictive models or machine-learning models. As an example, viseme prediction model 120 can be implemented using a Long Short-Term Memory (LSTM) model.

Figure 5:
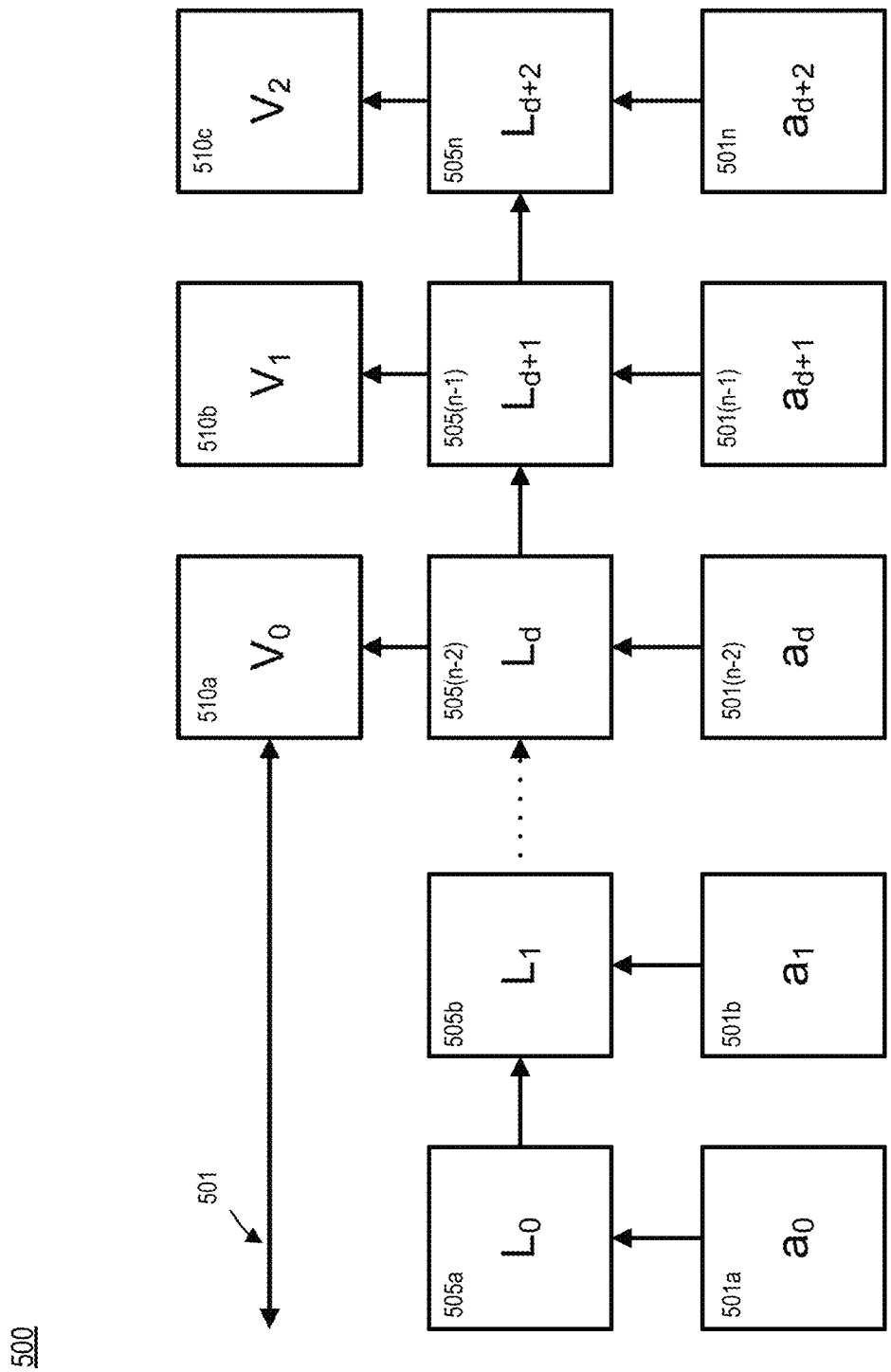
FIG. 5 depicts an example of a LSTM neural network used by viseme-generation application, according to certain embodiments of the present disclosure.

FIG. 5 depicts an example of a LSTM neural network used by viseme-generation application, according to certain embodiments of the present disclosure. FIG. 5 depicts LSTM model 500, which includes delay 501, inputs 501a-n, states 509a-n, and output visemes 510a-n. Viseme prediction model 120 can be implemented using LSTM model 500. In this example, LSTM model 500 is configured as a unidirectional single-layer LSTM with a 200-dimensional hidden state that is mapped linearly to 12 output viseme classes.

LSTM model 500 receives an input sequence of feature vectors $a_0, a_1, a_2, \ldots, a_n$ derived from sequences of streaming audio and outputs a corresponding sequence of visemes $v_0, v_1, v_2, \ldots v_n$. Feature vectors $a_0, a_1, a_2, \ldots a_n$ are indicated by inputs 501a-n. Visemes $v_0, v_1, v_2, \ldots v_n$ are indicated by output visemes 910a-c. LSTM model 500 includes internal states $L_0, L_1, L_2, \ldots L_{nn}$, depicted by internal states 505a-n. Internal states 505a-n represent internal values derived from the inputs 501a-n. Any number of internal states is possible.

LSTM model 500 predicts visemes based on feature vectors for past, present, or future windows in time. LSTM model 500 can consider feature vectors for future windows by delaying the output of the predicted viseme until subsequent feature vectors are received and analyzed. Delay 501, denoted by d, represents the number of time windows of look-ahead. For a current audio feature vector $a_t$, LSTM model 500 predicts a viseme that appears d windows in the past at $v_{t-d}$.

As depicted, the LSTM model 500 is configured with a delay of two, because two feature vectors $a_0$ and $a_1$ are processed before output viseme $v_0$ is generated. LSTM model 500 outputs the first predicted viseme $v_0$ that corresponds in time to the feature vector $a_0$, after receiving feature vectors $a_0$, $a_1$ and $a_2$. As shown, feature vectors $a_0$, $a_1$ and $a_2$ are used by LSTM model 500 in predicting output viseme $v_0$.

LSTM model 500 can therefore be configured with a different delay based on particular application requirements. Determination of the delay 501 involves a tradeoff between accuracy and latency. For example, a longer delay 501 provides LSTM model 500 additional data on which to make a prediction of an output viseme 510a, thereby improving the accuracy of the output viseme sequence. For example, when shortening the amount of future audio information, output visemes may display chatter. Chatter is excessive changing in mouth appearance reflected by the output visemes changing too quickly. Chatter can be due in part to the fact that some animations often change visemes slightly ahead of the speech that corresponds to the predicted viseme. In an embodiment, d=6 provides sufficient lookahead, but adds an additional 60 milliseconds of latency to the model.

But as discussed, in order to be realistic, animation viewed by the human speaker or an audience listening directly to the speaker requires a latency below a perceptible threshold, which precludes large amounts of buffering and look-ahead. Real-time animation viewed via broadcast can have an arbitrary delay that is not noticed by the viewers as long as audio and video signals are subjected to the same delay. But a delay that is too long risks foreclosing real-time operation, because for real-time systems, LSTM model 500 keeps perceptible delay below a human-detectable threshold. For example, in experimental results, viseme-generation application 102 can translate a 24 frames/second audio sequence into a viseme sequence with less than 200 milliseconds of latency. Such latency is within a tolerance range for real-time animation, i.e., not typically perceived by a human observing the animation.

In another embodiment, LSTM model 500 can output a probability that a particular viseme is a match for the feature vector. For example, LSTM model 500 may output a probability of 72% for viseme 202 and 28% for viseme 204. In this case, the viseme-generation application 102 can select the viseme with the highest probability, e.g., viseme 202.

In a further embodiment, viseme-generation application 102 outputs the viseme sequence at a frame rate that differs from a frame rate used for animation. For example, viseme-generation application 102 outputs visemes at 100 frames/second whereas animation is generated at 24 frames/second. Various techniques may be used by viseme-generation application 102 to remove noise, or erroneous viseme artifacts created by frame rate conversion, i.e., converting the visemes sequence from the output frame rate to the animation frame rate.

For example, the viseme-generation application 102 could classify a viseme as noise if that viseme is presented for less than a threshold number of frames. In one example, a viseme that is displayed for one frame is considered to be a result of frame-rate conversion noise, since animators do not typically show a particular viseme for less than two frames. To remove such noise, viseme-generation application 102 delays outputting the predicted viseme sequence by a predetermined number of frames. In an example, a delay of two frames is used, in accordance with some animation practices. By delaying, viseme-generation application 102 provides a look-ahead to adjust the output viseme sequence in the event that the output viseme is present for less than a threshold of frames. For example, viseme-generation application 102 determines that a current frame includes a particular viseme and that neither a subsequent frame nor a previous frame, e.g., a frame that is buffered, includes the particular viseme. In response, viseme application maps the viseme of the previous frame to the current frame. Therefore, the output viseme sequence does not have viseme transitions.

In another embodiment, viseme-generation application 102 can remove noise from the resulting viseme sequence. For example, viseme-generation application 102 remaps the visemes by subsampling the 100 frames/second viseme sequence to a 24 frames/second sequence. Viseme-generation application 102 can determine that a particular viseme of the sequence of visemes corresponds to one frame of video and remove the particular viseme from the sequence of visemes, replacing the removed viseme with either the previous or the subsequent viseme.

In yet a further embodiment, in contrast to a delay implemented by LSTM model 500 in order to analyze future feature vectors, viseme-generation application 102 can create a feature vector 115 that includes MFCC information for a number of future windows. In this manner, information from future time windows is built into a particular feature vector rather than being separately considered by LSTM model 500.

In an embodiment for performance animation, or non-real-time use, LSTM model 500 can be a bi-directional LSTM. Such a configuration can be used when latency is not a concern. For example, in an offline-configuration, viseme-generation application 102 can receive a set of feature vectors derived from audio corresponding to an entire speech and operate on the entire speech simultaneously. Having feature vectors for an entire sequence, as opposed to one at a time, or a window at a time, can increase accuracy of the predicted visemes.

Returning to FIG. 3, at block 304, process 300 involves providing a visualization corresponding to the predicted viseme by accessing a list of visualizations, mapping the viseme to a listed visualization, and configuring a display device to display the viseme. For example, viseme-generation application 102 accesses a list of visualizations. Each visualization in the list corresponds to a particular viseme. For example, viseme 205 may be animated in a certain manner that is different, for example, from viseme 206. Viseme-generation application 102 maps the predicted viseme to the corresponding visualization, for example, by doing a table lookup. Viseme-generation application 102 can then configure a display device to display the viseme.

Training the Viseme Prediction Model

As discussed, viseme prediction model 120 is trained using training data 130a-n. Training data can include a set of feature vector and corresponding predicted visemes. Viseme-generation application 102 can be used to generate training data 130a-n.

Embodiments described herein use machine-learning to train viseme prediction model 120. As discussed, various types of machine-learning models can implement viseme prediction model 120. In a typical training process, viseme prediction model 120 learns to map sequences of inputs, typically feature vectors, to sequences of outputs. In an example training process, viseme prediction model 120 learns to predict visemes from a diverse set of audio sequences from different speakers. As a simplified example, the training data includes a mapping between a particular audio sequence or a particular feature vector to a corresponding output or viseme, where the feature vectors represent audio samples from different speakers. Viseme prediction model 120 learns which feature vectors (and thereby which audio sequences) correspond to the particular viseme, and thereby learns to account for variations in different parameters of the feature vectors (i.e., variations in speaking characteristics from different speakers). Thus, with training data that includes a wide variety of audio data mapped to corresponding visemes, trained viseme prediction model 120 can accurately map a wide variety of speaking styles to particular viseme visualizations.

In an example, training data 130a-n includes multiple training vectors. Each training vector includes an input sequence such as feature vector for an audio sequence and a corresponding output sequence such as an output viseme (e.g., a feature vector for the sound "Sh" and a viseme of a mouth shape for the sound "Sh"). The corresponding output viseme for a given audio sequence can be generated by hand, e.g., by an animator, or an automated tool such as process 600 described with respect to FIG. 6.

The sets of training data 130a-n can be divided into a training group and a test group. The training group of data is provided to the machine-learning model. The test group of training data is used for subsequent testing of the trained model. In this manner, viseme prediction model 120 is not tested with the same data on which it was trained.

Figure 6:
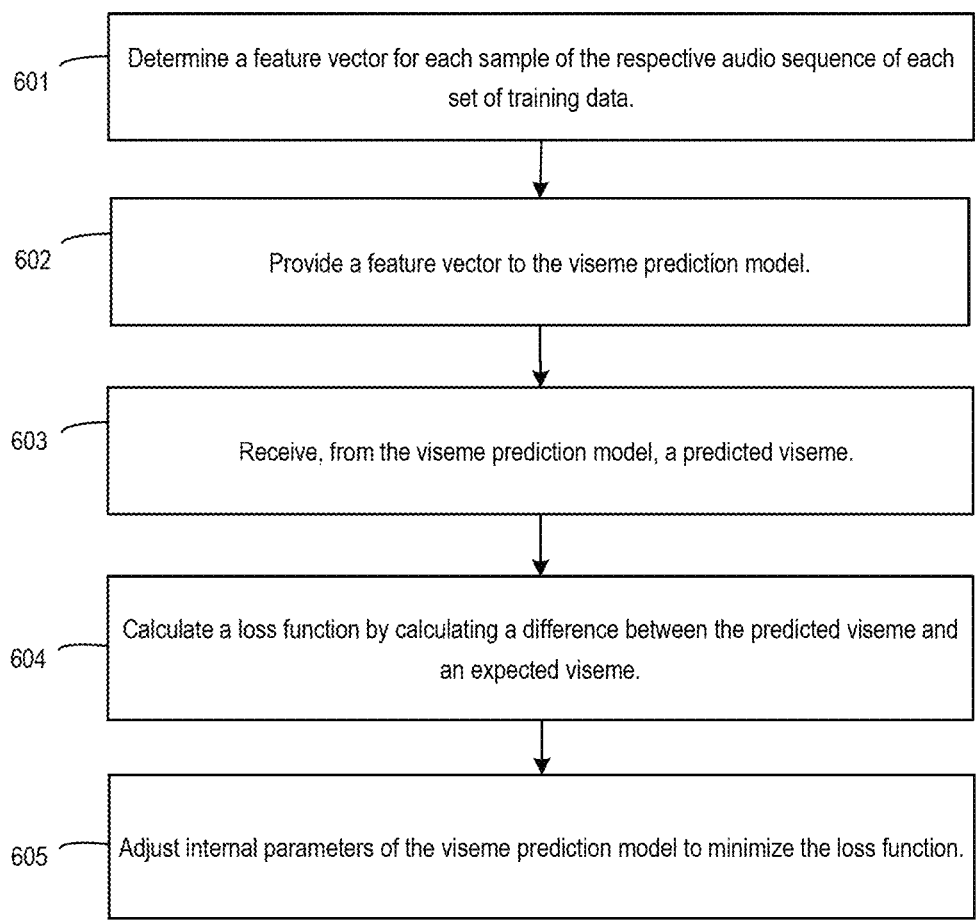
FIG. 6 is a flowchart that depicts an example of a process for training a viseme-generation system, according to certain embodiments of the present disclosure.

FIG. 6 is a flowchart that depicts an example of a process 600 for training a viseme-generation system, according to certain embodiments of the present disclosure. Training can be an iterative process. For example, after viseme-generation application 102 has completed block 605, process 600 can continue again with block 601 until either the training data set 130a-n has been provided to the viseme prediction model 120, or the viseme prediction model is sufficiently trained.

Training data includes input sequences such as training vectors and corresponding output sequences such as expected visemes for each sequence. For example, if a particular audio sequence is of a speaker uttering the "Ah" sound, then the predicted viseme corresponds to the "Ah" sound, i.e., the mouth shape that a speaker makes when uttering the sound.

At block 601, process 600 involves determining a feature vector for each sample of the respective audio sequence of each set of training data. For example, training data 130a includes audio samples. In that case, the viseme-generation application 102 determines, for a window of audio samples, feature vector 115 in a substantially similar manner as described with respect to block 302 in process 300. As discussed with respect to FIGS. 3 and 4, feature vector 115 can include one or more of MFCC component 402, energy component 403, MFCC derivatives 404, and energy level derivative 405.

At block 602, process 600 involves providing the feature vector to the viseme prediction model. The viseme-generation application 102 provides feature vector 115, which represents a corresponding audio sequence, to viseme prediction model 120.

At block 603, process 600 involves receiving, from the viseme prediction model, a predicted viseme. The viseme-generation application 102 receives a predicted viseme from viseme prediction model 120. The predicted viseme corresponds to the feature vector 115, and to the corresponding input audio sequence from which the feature vector was generated.

At block 604, process 600 involves calculating a loss function by calculating a difference between predicted viseme and the expected viseme. The expected viseme for the feature vector is included in the training data. The expected viseme can be generated by hand-animation, e.g., using an animator to map the audio from which the feature vector was generated to a viseme from the set of visemes. The loss function is used by viseme prediction model 120 to minimize error over time.

At block 605, process 600 involves adjusting internal parameters, or weights, of the viseme prediction model to minimize the loss function. With each iteration, the viseme-generation application 102 seeks to minimize the loss function until viseme prediction model 120 is sufficiently trained. Viseme-generation application 102 can use a backpropagation training method to optimize internal parameters of the LSTM model 500. Backpropagation updates internal parameters of the network to cause a predicted value to be closer to an expected output. Viseme-generation application 102 can use cross-entropy loss to penalize classification errors with respect to the expected viseme sequence. The ground truth viseme sequences can be animated at 24 frames/second and up-sampled to match the 100 frames/second frequency of the model.

Viseme-generation application 102 can continue block 601-605 of process 600 as necessary until viseme prediction model 120 is sufficiently trained. At a point at which adequate training has been performed, the viseme-generation application 102 can test the viseme prediction model. For each test vector, the application provides the corresponding feature vector to the viseme prediction model 120. The viseme-generation application 102 receives a predicted viseme from the viseme prediction model 120.

The predicted viseme and the expected viseme can be compared in different ways. For example, an automated system can be used. Alternatively, a training data generation system can provide a display that shows a user the predicted viseme sequence and an expected viseme sequence. The user can indicate which sequences are more realistic or accurate by providing feedback to the training data generation system.

If viseme-generation application 102 determines that the viseme prediction model 120 is predicting incorrect visemes for a threshold number of instances, then viseme prediction model 120 can provide additional training data 130a-n to the viseme prediction model 120 and re-test accordingly.

As discussed, training data can involve using human animators to map audio sequences to predicted visemes. Such a process, while useful, can be expensive in time and cost. Because a threshold amount of training data is needed such that viseme prediction model 120 is sufficiently trained, generating training data by hand can make the use of such models impractical.

Embodiments described herein use automatic speech alignment such as time-warping techniques to generate, from a first set of training data, additional sets of training data for different speakers. More specifically, viseme-generation application 102 can automatically propagate hand animated visemes for a first audio sequence spoken by a first speaker to a second audio sequence spoken by a second speaker. In so doing, viseme-generation application 102 removes the need for the second speaker's speech to be hand-animated as was done to the first speaker's speech. Embodiments can increase the amount of available training data by a factor of four or more and can produce acceptable results with as little as thirteen to nineteen minutes of hand-authored lip sync data.

Figure 7:
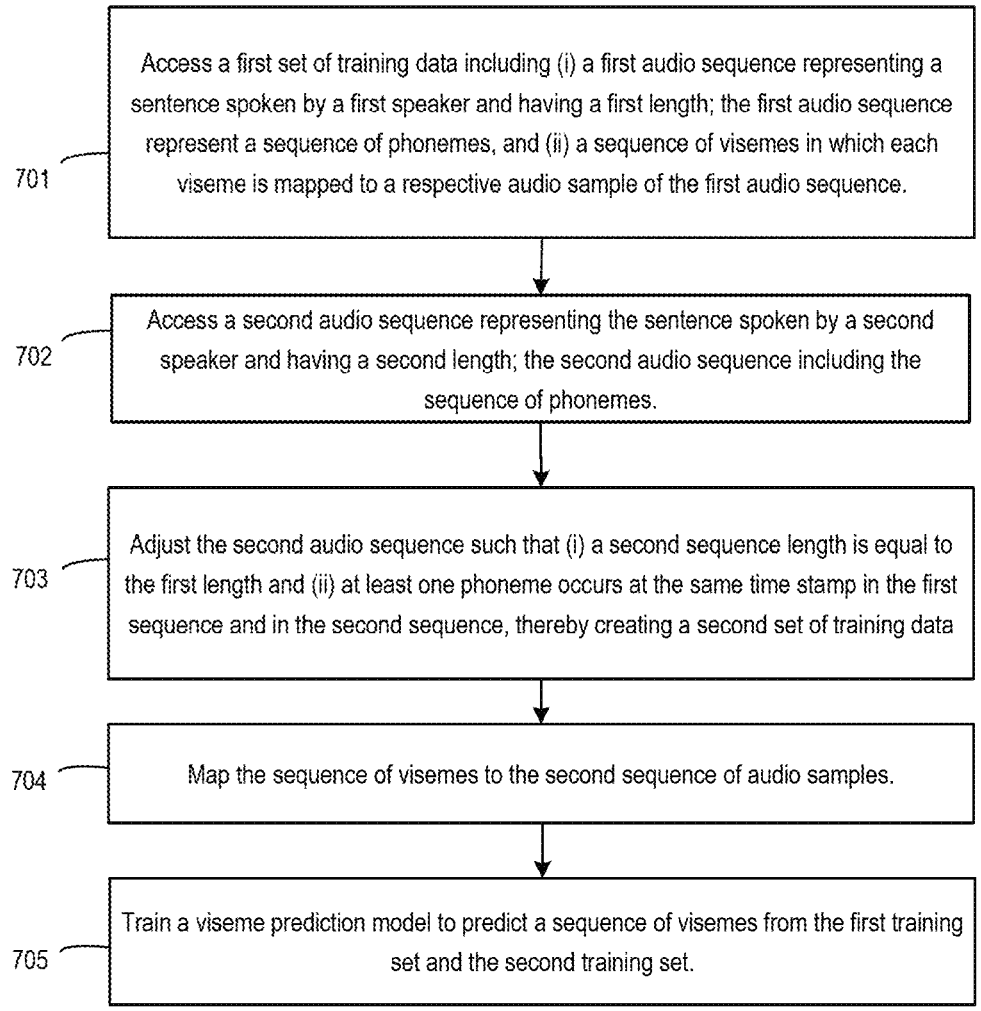
FIG. 7 is a flowchart that depicts an example of a process for generating training data, according to certain embodiments of the present disclosure.
Figure 8:
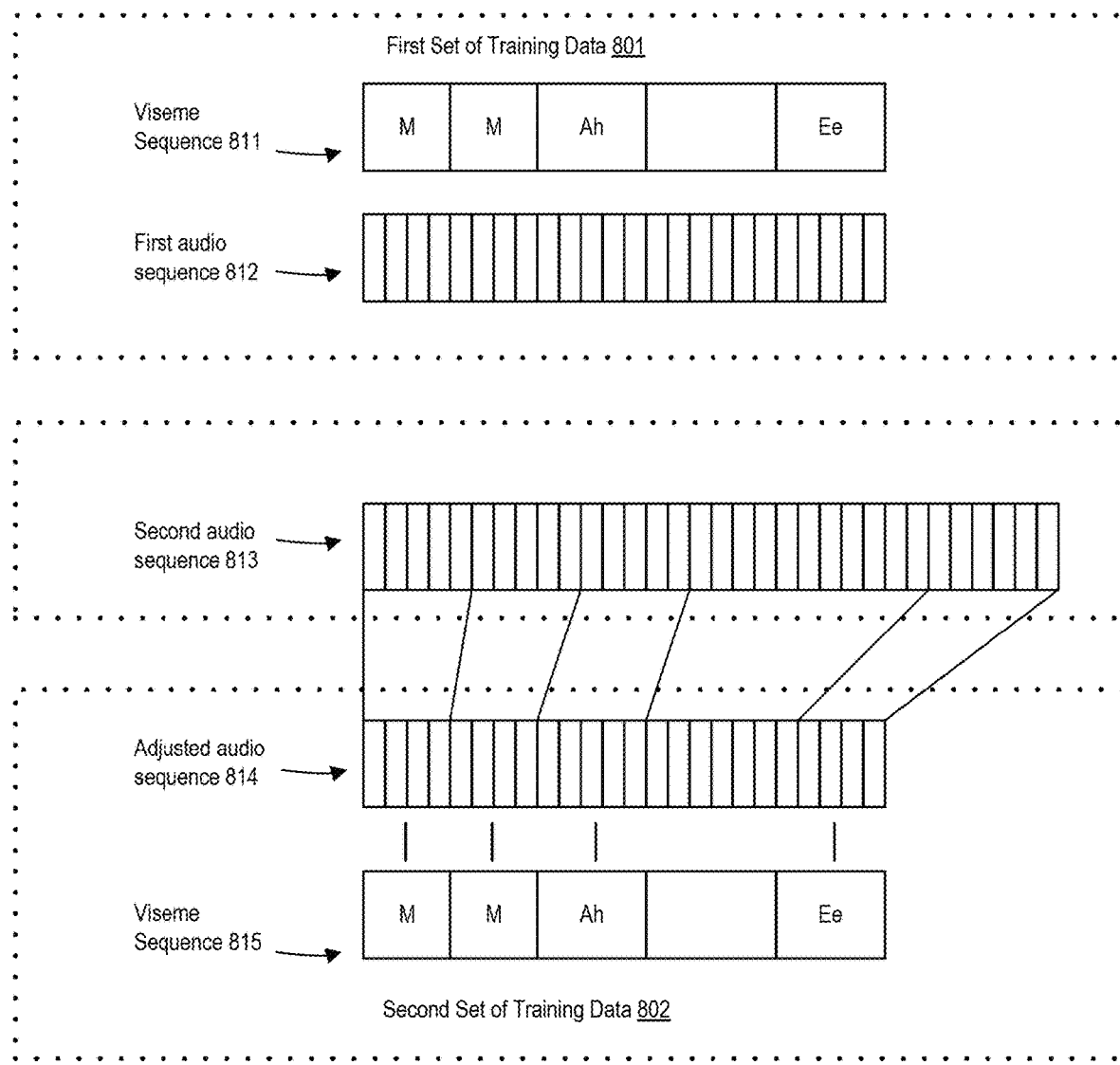
FIG. 8 depicts an example of time-warping used to generate training data, according to certain embodiments of the present disclosure.

FIG. 7 is a flowchart that depicts an example of a process for generating training data, according to certain embodiments of the present disclosure. FIG. 7 is shown in conjunction with FIG. 8. FIG. 8 depicts an example of time-warping used to generate training data, according to certain embodiments of the present disclosure. FIG. 8 includes training data 800, which includes a first set of training data 801 and a second set of training data 802. First set of training data 801 includes viseme sequence 811 and first audio sequence 812. Second set of training data 802 includes adjusted audio sequence 814 and viseme sequence 815.

At block 701, process 700 involves accessing a first set of training data including a first audio sequence representing a sentence spoken by a first speaker and having a first length. For example, viseme-generation application 102 accesses the first set of training data 801. The first set of training data 801 includes viseme sequence 811 and first audio sequence 812.

The audio samples in first audio sequence 812 represent a sequence of phonemes. The visemes in viseme sequence 811 are a sequence of visemes, each of which correspond to one or more audio samples in first audio sequence 812. Viseme sequence 811 can be hand-generated. For example, an animator lip syncs sentences from a particular dataset. The first set of training data can be training data 130a.

At block 702, process 700 involves accessing a second audio sequence representing the sentence spoken by a second speaker and having a second length. Second audio sequence 813 includes the sequence of phonemes. Viseme-generation application 102 warps a second recording of the same sentence as spoken in the first sequence to match the timing of the second speaker to the first speaker. In this manner, viseme-generation application 102 can reuse the same viseme sequence 811 with multiple different input streams from multiple different speakers.

At block 703, process 700 involves adjusting the second audio sequence such that (i) a second sequence length is equal to the first length and (ii) at least one phoneme occurs at the same time stamp in the first sequence and in the second sequence, thereby creating a second set of training data. Viseme-generation application 102 adjusts the second audio sequence 813 to match the first audio sequence 812, thereby creating adjusted audio sequence 814.

Viseme-generation application 102 maps the second sequence to the first sequence such that the sounds or phonemes within the audio sequence occur at the same time in each sequence. In an example, the first audio sequence reflects the first speaker speaking the sound "Ah" at a particular time stamp. The second speaker most likely did not speak the sound "Ah" at precisely the same time as the first speaker did. Therefore, viseme-generation application 102 maps the second audio sequence to the first audio sequence such that the corresponding sound "Ah" occurs at the same time stamp.

Because different speakers emphasize different sounds or phonemes, and speak at different speeds, the adjustment of the second audio sequence is non-linear. For example, the time adjustment made to a particular phoneme may be different than an adjustment made for another phoneme. Similarly, a section of the second audio sequence relative to the corresponding part of the first audio sequence may be compressed in length, whereas a sequence spoken more quickly than the first may be expanded.

At block 704, process 700 involves mapping the sequence of visemes to the second audio sequence. Viseme-generation application 102 adjusts the second audio sequence such that a length of the second audio sequence is equal to the length of the first audio sequence and such that the phonemes uttered by the second speaker occur at the same time stamps as the corresponding phonemes occur in the first sequence. In this manner, the timing of the phonemes is thereby warped to fit the second audio sequence. With the second audio sequence mapped to the first audio sequence, the viseme sequence, which corresponds to the first audio sequence, also now corresponds to the second audio sequence. By so doing, the viseme-generation application 102 has created a second set of training data that includes adjusted audio sequence 814 and viseme sequence 815.

At block 705, process 700 involves training a viseme prediction model to predict a sequence of visemes from the first training set and the second training set. Training occurs in a substantially similar fashion as described in process 600.

In an embodiment, viseme-generation application 102 can warp both a first audio sequence and a corresponding sequence of visemes to a second audio sequence, rather than warping the second audio sequence that lacks a corresponding set of visemes to a first audio sequence, as described with respect to process 700.

For example, viseme-generation application 102 receives a first set of training data including a first audio sequence and a corresponding set of visemes and a second set of training data including a second audio sequence. Viseme-generation application 102 adjusts the first audio sequence such that a length of the first sequence is equal to a length of the second sequence and warps the set of visemes to match the second sequence, thereby creating a second set of training data.

Because the second audio sequence is unmodified, viseme-generation application 102 preserves more natural variations in the voice of the second audio sequence, as opposed to training viseme prediction model 120 with the warped second sequence. Viseme-generation application 102 provides an unmodified version of the first set of training data or the second set of training data to viseme prediction model 120.

In this manner, viseme-generation application 102 trains viseme prediction model 120 with two sets of training data, each of which contains audio that is unmodified. In contrast, process 700, includes a second audio sequence that is modified from its original form.

Example of a Computing System for Implementing Certain Embodiments

Figure 9:
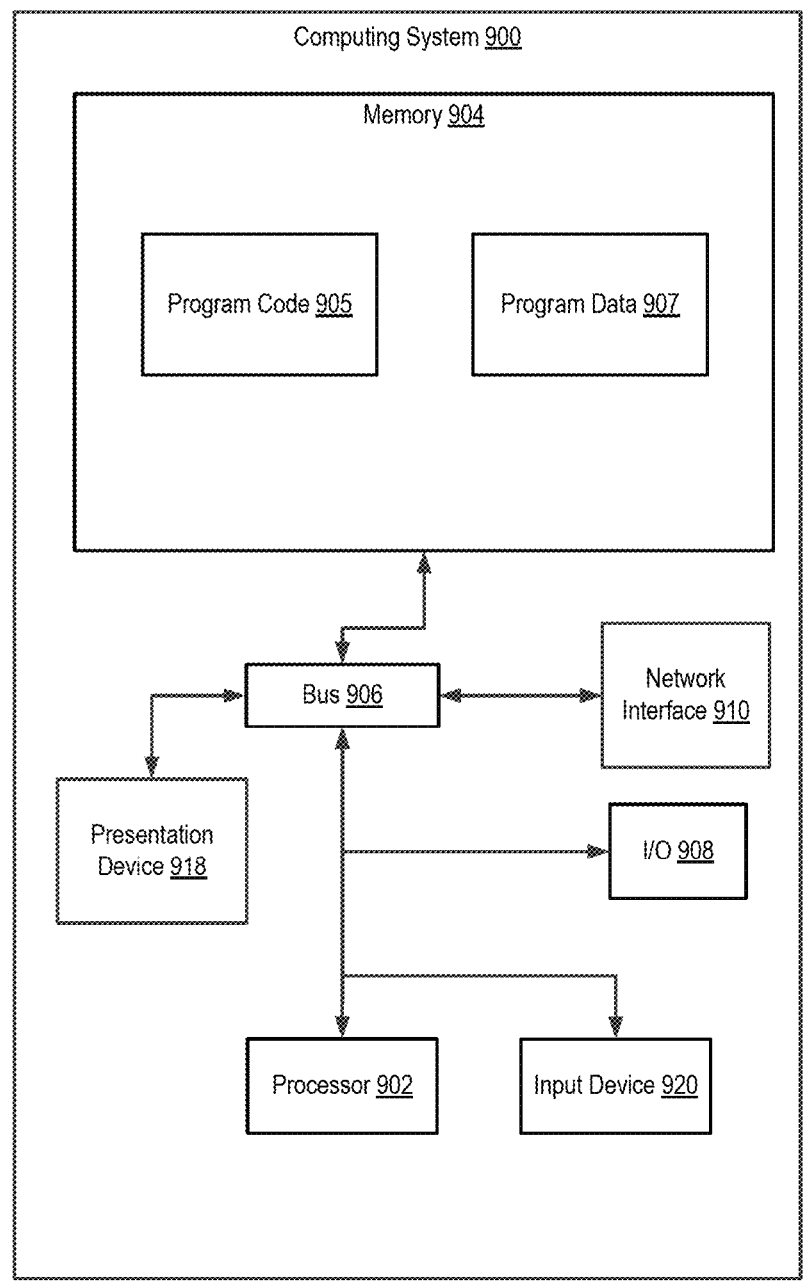
FIG. 9 depicts an example of a computing system for implementing certain embodiments of the present disclosure.

Any suitable computing system or group of computing systems can be used for performing the operations described herein. For example, FIG. 9 depicts an example of a computing system for implementing certain embodiments of the present disclosure. The implementation of computing system 900 could be used for one or more of viseme-generation application 102 or viseme predictive model 120.

The depicted example of a computing system 900 includes a processor 902 communicatively coupled to one or more memory devices 904. The processor 902 executes computer-executable program code stored in a memory device 904, accesses information stored in the memory device 904, or both. Examples of the processor 902 include a microprocessor, an application-specific integrated circuit ("ASIC"), a field-programmable gate array ("FPGA"), or any other suitable processing device. The processor 902 can include any number of processing devices, including a single processing device.

A memory device 904 includes any suitable non-transitory computer-readable medium for storing program code 905, program data 907, or both. Program code 905 and program data 907 can be from viseme-generation application 102, viseme prediction model 120, or any other applications or data described herein. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 900 may also include a number of external or internal devices, an input device 920, a presentation device 918, or other input or output devices. For example, the computing system 900 is shown with one or more input/output ("I/O") interfaces 908. An I/O interface 908 can receive input from input devices or provide output to output devices. One or more buses 906 are also included in the computing system 900. The bus 906 communicatively couples one or more components of a respective one of the computing system 900.

The computing system 900 executes program code 905 that configures the processor 902 to perform one or more of the operations described herein. Examples of the program code 905 include, in various embodiments, modeling algorithms executed by the viseme-generation application 102, or other suitable applications that perform one or more operations described herein. The program code may be resident in the memory device 904 or any suitable computer-readable medium and may be executed by the processor 902 or any other suitable processor.

In some embodiments, one or more memory devices 904 stores program data 907 that includes one or more datasets and models described herein. Examples of these datasets include interaction data, environment metrics, training interaction data or historical interaction data, transition importance data, etc. In some embodiments, one or more of data sets, models, and functions are stored in the same memory device (e.g., one of the memory devices 904). In additional or alternative embodiments, one or more of the programs, data sets, models, and functions described herein are stored in different memory devices 904 accessible via a data network.

In some embodiments, the computing system 900 also includes a network interface device 910. The network interface device 910 includes any device or group of devices suitable for establishing a wired or wireless data connection to one or more data networks. Non-limiting examples of the network interface device 910 include an Ethernet network adapter, a modem, and/or the like. The computing system 900 is able to communicate with one or more other computing devices via a data network using the network interface device 910.

In some embodiments, the computing system 900 also includes the input device 920 and the presentation device 918 depicted in FIG. 9. An input device 920 can include any device or group of devices suitable for receiving visual, auditory, or other suitable input that controls or affects the operations of the processor 902. Non-limiting examples of the input device 920 include a touchscreen, a mouse, a keyboard, a microphone, a separate mobile computing device, etc. A presentation device 918 can include any device or group of devices suitable for providing visual, auditory, or other suitable sensory output. Non-limiting examples of the presentation device 918 include a touchscreen, a monitor, a speaker, a separate mobile computing device, etc. Presentation device 918 is configurable to display animations derived from an output sequence of visemes. In addition, presentation device 918 can display user interface elements, such as sliders or controls, that allow configuration of combined parameters 140.

Although FIG. 9 depicts the input device 920 and the presentation device 918 as being local to the computing device that executes viseme-generation application 102, other implementations are possible. For instance, in some embodiments, one or more of the input device 920 and the presentation device 918 can include a remote client-computing device that communicates with the computing system 900 via the network interface device 910 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes poses of example rather than limitation, and does not preclude the inclusion of such modifications, variations, and/or additions to the present subject matter as would be readily apparent to one of ordinary skill in the art.

What is claimed is:

1. A method of predicting visemes from an audio sequence, the method comprising:
   accessing a first set of training data comprising:
   (i) a first audio sequence of samples representing a sentence spoken by a first speaker and having a first length, wherein the audio sequence represents a sequence of phonemes, and
   (ii) a sequence of visemes, wherein each viseme is mapped to a respective audio sample of the first audio sequence of samples;
   creating a second set of training data by:
   accessing a second audio sequence of samples representing the same sentence spoken by a second speaker and having a second length, wherein the second audio sequence of samples comprises the sequence of phonemes;
   adjusting the second audio sequence of samples such that (i) a second sequence length is equal to the first length and (ii) at least one phoneme occurs at an identical time stamp in the first audio sequence of samples and in the second audio sequence of samples;
   mapping the sequence of visemes to the second audio sequence of samples; and
   training a viseme prediction model to predict a sequence of visemes from the first set of training data and the second set of training data.

2. The method of claim 1, wherein training the viseme prediction model comprises:
   determining a feature vector for each sample of the respective audio sequence of each set of training data;
   providing the feature vectors to the viseme prediction model;

receiving, from the viseme prediction model, a predicted viseme;
calculating a loss function by calculating a difference between the predicted viseme and an expected viseme; and
adjusting internal parameters of the viseme prediction model to minimize the loss function.

3. The method of claim 2, wherein the feature vector comprises:
a set of mel-frequency cepstrum coefficients for the samples,
a logarithm of a mean energy of the samples, and
a first temporal derivative of the samples.

4. The method of claim 1, further comprising:
accessing a plurality of speech samples corresponding to a time period, wherein a present subset of the speech samples corresponds to a present time period and a past subset of the speech samples corresponds to a past time period;
computing a feature vector representing the plurality of speech samples;
determining a sequence of predicted visemes representing speech for the present subset by applying the feature vector to the viseme prediction model trained to predict a viseme from a plurality of predetermined visemes, wherein the sesquence of predicted visemes is based on the past subset and the present subset; and
providing a visualization corresponding to the sequence of predicted visemes, wherein providing the visualization comprises:
accessing a list of visualizations,
mapping the viseme to a listed visualization, and
configuring a display device to display the listed visualization.

5. The method of claim 4, further comprising:
mapping each of the sequence of visemes to a frame rate;
determining that a particular viseme of the sequence of visemes corresponds to a frame of video; and
removing the particular viseme from the sequence of visemes.

6. The method of claim 4, further comprising:
mapping each of the sequence of visemes to a frame rate;
delaying an output of the sequence of predicted visemes by a predetermined number of frames; and
responsive to determining that (i) a current frame includes a particular viseme and (ii) a subsequent frame and a previous frame lack the particular viseme, mapping the viseme of the previous frame to the current frame.

7. The method of claim 4, further comprising:
mapping each of the sequence of visemes to a frame rate; and
representing the sequence of visemes on a graphical timeline according to the frame rate.

8. A system comprising:
a non-transitory computer-readable medium storing computer-executable program instructions and
a processing device communicatively coupled to the non-transitory computer-readable medium for executing the computer-executable program instructions, wherein executing the computer-executable program instructions configures the processing device to perform operations comprising:
accessing a plurality of speech samples corresponding to a time period, wherein a present subset of the speech samples corresponds to a present time period and a past subset of the speech samples corresponds to a past time period;
computing a feature vector representing the plurality of speech samples;
determining a sequence of predicted visemes representing speech for the present subset by applying the feature vector to a viseme prediction model trained with a second training data set comprising a second audio sequence spoken by a second speaker and a sequence of visemes, wherein the second training data set is created by mapping the second audio sequence to a first audio sequence; and
providing a visualization corresponding to the sequence of predicted visemes, wherein providing the visualization comprises:
accessing a list of visualizations,
mapping each viseme of the predicted sequence of visemes to a listed visualization, and
configuring a display device to display the listed visualization.

9. The system of claim 8, further comprising:
increasing an amplitude of each of the plurality of speech samples;
determining, from the plurality of speech samples, a speech sample that has an amplitude greater than a threshold; and
reducing the amplitude of the speech sample.

10. The system of claim 8, wherein computing the feature vector further comprises:
calculating a set of mel-frequency cepstrum coefficients for the plurality of speech samples,
calculating a logarithm of a mean energy of the plurality of speech samples, and
calculating a first temporal derivative of the plurality of speech samples.

11. The system of claim 8, the operations further comprising:
mapping each of the sequence of visemes to a frame rate;
delaying an output of the sequence of predicted visemes by a predetermined number of frames; and
responsive to determining that (i) a current frame includes a particular viseme and (ii) a subsequent frame and a previous frame lack the particular viseme, mapping a viseme of the previous frame to the current frame.

12. The system of claim 8, the operations further comprising:
mapping the sequence of predicted visemes to a frame rate; and
representing the sequence of predicted visemes on a graphical timeline according to the frame rate.

13. A non-transitory computer-readable storage medium storing computer-executable program instructions, wherein when executed by a processing device, the computer-executable program instructions cause the processing device to perform operations comprising:
accessing a first set of training data comprising:
(i) a first audio sequence representing a sentence spoken by a first speaker and having a first length, wherein the first audio sequence represents a sequence of phonemes and has a first length, and
(ii) a sequence of visemes, wherein each viseme is mapped to a respective audio sample of the first audio sequence;
creating a second set of training data by:
accessing a second audio sequence representing the sentence spoken by a second speaker and having a second length, wherein the second audio sequence comprises the sequence of phonemes;

adjusting the first audio sequence such that (i) the first length is equal to the second length and (ii) at least one phoneme occurs at an identical time stamp in the first audio sequence and in the second audio sequence;

mapping the sequence of visemes to the adjusted first audio sequence; and training a viseme prediction model to predict a sequence of visemes from the first set of training data and the second set of training data.

14. The non-transitory computer-readable storage medium of claim 13, wherein training the viseme prediction model comprises:

determining a feature vector for each sample of the respective audio sequence of each set of training data;

providing the feature vectors to the viseme prediction model;

receiving, from the viseme prediction model, a predicted viseme;

calculating a loss function by calculating a difference between the predicted viseme and an expected viseme; and adjusting internal parameters of the viseme prediction model to minimize the loss function.

15. The non-transitory computer-readable storage medium of claim 14, wherein the feature vector comprises:

a set of mel-frequency cepstrum coefficients for the speech samples, a logarithm of a mean energy of each speech sample, and a first temporal derivative of each speech sample.

16. The non-transitory computer-readable storage medium of claim 13, wherein program instructions further cause the processing device to perform operations comprising:

accessing a plurality of speech samples corresponding to a time period, wherein a present subset of the speech samples corresponds to a present time period and a past subset of the speech samples corresponds to a past time period;

computing a feature vector representing the plurality of speech samples;

determining a sequence of predicted visemes representing speech for the present subset by applying the feature vector to the viseme prediction model trained to predict a viseme from a plurality of predetermined visemes, wherein the sequence of predicted visemes is based on the past subset and the present subset; and providing a visualization corresponding to the sequence of predicted visemes, wherein providing the visualization comprises:

accessing a list of visualizations, mapping the viseme to a listed visualization, and configuring a display device to display the listed visualization.

17. The non-transitory computer-readable storage medium of claim 16, further comprising:

mapping each of the sequence of visemes to a frame rate;

determining that a particular viseme of the sequence of visemes corresponds to a frame of video; and removing the particular viseme from the sequence of visemes.

18. The non-transitory computer-readable storage medium of claim 16, wherein program instructions further cause the processing device to perform operations comprising:

mapping each of the sequence of visemes to a frame rate;

delaying an output of the sequence of predicted visemes by a predetermined number of frames; and responsive to determining that (i) a current frame includes a particular viseme and (ii) a subsequent frame and a previous frame lack the particular viseme, mapping the viseme of the previous frame to the current frame.

19. The non-transitory computer-readable storage medium of claim 16, wherein program instructions further cause the processing device to perform operations comprising:

mapping the sequence of predicted visemes to a frame rate; and representing the sequence of predicted visemes on a graphical timeline according to the frame rate.

20. The non-transitory computer-readable storage medium of claim 16, further comprising:

increasing an amplitude of each of the plurality of speech samples;

determining, from the plurality of speech samples, a speech sample that has an amplitude greater than a threshold; and reducing the amplitude of the speech sample.

* * * * *